C. SHARPS.

Revolver.

Reissued Feb. 12, 1867

No. 2,481.

Witnesses.
Wm. Avert Stuel
John Parker

Inventor.
C. Sharps
By his Atty.
W. H. Hoover

N. PETERS, PHOTO-LITHOGRAPHER, WASHINGTON, D. C.

UNITED STATES PATENT OFFICE.

CHRISTIAN SHARPS, OF PHILADELPHIA, PENNSYLVANIA.

IMPROVEMENT IN BREECH-LOADING FIRE-ARMS.

Specification forming part of Letters Patent No. 22,753, dated January 25, 1859; Reissue No. 1,199, dated June 18, 1861; Reissue No. 2,481, dated February 12, 1867.

DIVISION B.

*To all whom it may concern:*

Be it known that I, CHRISTIAN SHARPS, of Philadelphia, Pennsylvania, did, on the 25th day of January, A. D. 1859, obtain Letters Patent of the United States for an Improvement in Breech-Loading Repeating Fire-Arms, that the said Letters Patent were reissued on the 18th day of June, A. D. 1861; and that I declare the following to be a full, clear, and exact description of that part of the said invention which consists—

First, of a lever and connecting-rod, constructed and arranged in respect to the barrel and stock, as described hereinafter, for the threefold purpose of operating the barrel, locking and releasing the same, and serving as a trigger-guard; secondly, of a device, described hereinafter, whereby the spent cartridges are withdrawn from the barrel on moving the latter forward from the breech.

Figure 1:
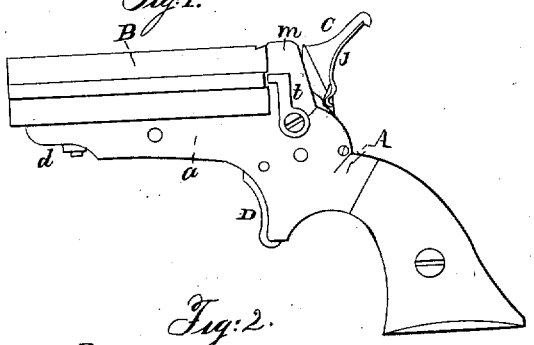
Figure 2:
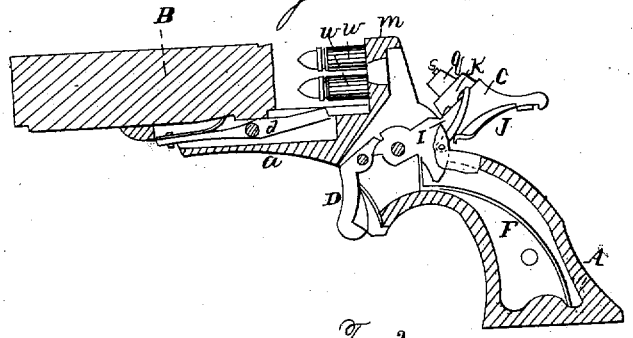
Figure 5:
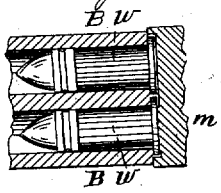
Figure 3:
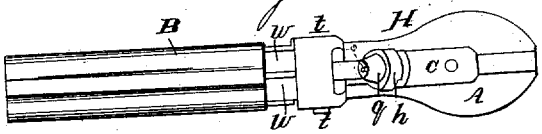
Figure 6:
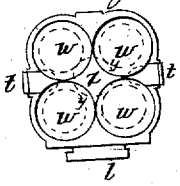
Figure 4:
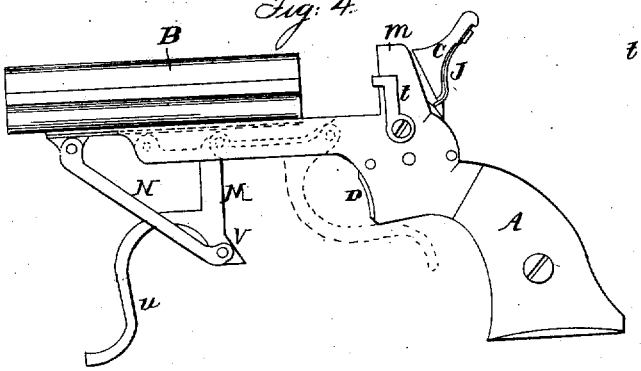

On reference to the accompanying drawings, which form a part of this specification, Figure 1 is an exterior view of a fire-arm, showing the device for retracting the cartridges; Fig. 2, a sectional view of Fig. 1, showing the barrel moved forward; Fig. 3, a plan view of the fire-arm; Fig. 4, a side view of the fire-arm, showing the levers for operating and locking the barrel; Fig. 5, an enlarged sectional view of part of the barrel and breech; Fig. 6, an enlarged view of the rear of the barrel.

Similar letters refer to similar parts throughout the several views.

A is the stock of a pistol, and B the barrel, which in this instance has four bores open at the rear and arranged in the manner illustrated in Fig. 6, the bores being at equal distances apart from each other and from a point, *x*, in the center of the barrel.

The under side of the barrel is made perfectly straight, so as to fit accurately on the projecting portion *a* of the stock, which has grooves for receiving the projection *b* on the under side of the barrel, so that the latter can be moved to and fro longitudinally, while it is maintained in close contact with the stock by the said projection.

In a recess formed in the projection *a* of the stock is hung a catch-lever, *d*, Fig. 2, the end of one arm of which fits into a notch in the under side of the barrel, so as to lock the latter to the breech, a spring pressing on the other arm, which can be forced upward from below, so as to release the barrel when the latter has to be moved outward from the breech. I adopt this mode of locking and unlocking the barrel in arms of the smaller class only. For arms of the larger class I use the device illustrated in Fig. 5, which I will describe hereinafter.

C is the hammer, D the trigger, and E the mainspring, of the fire-arm, all being arranged within a recess formed in the stock.

H is the discharger, which is arranged to fit snugly and revolve freely in the hammer, so as to strike the heads of the cartridges one after another on the edge at the points *y*, Fig. 6. The manner in which this discharger is constructed and is caused to turn on the movement of the hammer and to strike the edge of one cartridge after another are matters not appertaining to that part of the invention treated of in the present specification, but are fully described in another specification, which I have prepared in applying for a reissue in two divisions of my aforesaid reissued patent of June 18, 1861. Further allusion here to the discharger and its operations will consequently be unnecessary.

It should be understood that the cartridges used in connection with the fire-arm are those consisting of a metal casing containing powder, and having in front a bullet and at the rear a flange or head for containing the detonate, and for preventing the cartridges from passing too far into the bore of the barrel. After the barrel has been moved forward to the proper distance one of these cartridges is inserted into the rear of each bore, so that the several heads will occupy the relative position illustrated in Fig. 6. The barrel is then moved back to the breech and locked, the heads of the cartridges being contained in recesses in the said breech.

On each side of the stock is secured a spring-catch, *t*, the ends of the catches being so formed as to project inward in front of the breech, a slight incision on each side of the barrel preventing the latter, when moved toward the breech, from interfering with the points of the said catches, which are so constructed and situated that when the barrel, with its cartridges, is brought up to the breech the bent end of one catch shall pass between the enlarged ends of the upper and lower cartridges and the barrel on one side and the end of the opposite catch between the enlarged ends of the upper and lower cartridge and the barrel on the opposite side, as seen in Fig. 6, the points of the clips assuming this position without any other aid than the presence of the enlarged ends of the cartridges against them when the barrel is brought home to the breech. On pushing the barrel forward the catches *t t* maintain their hold of the heads of the spent cartridges, the latter being withdrawn from their respective bores and dropping to the ground.

It will be observed that as the barrel is moved away from the breech the cartridges are retained in their proper position for allowing the spring-catches *t t* to retain their hold of the heads of the cartridges.

In Fig. 4, a lever, M, of which the trigger-guard *u* forms a part, is hung to a pin in the projecting portion *a* of the stock, and to this lever is hinged one end of the rod N, the opposite end of which is hinged to a projection on the under side of the barrel B. An angular projection, V, is formed on the lever M, and the projection is adapted to a notch in the under side of the barrel and near the rear of the same. When the barrel is moved outward from the breech the above-named parts will assume the position seen in the figure. When the barrel has to be brought up to the breech the operator draws the lever M to the position shown by dotted lines, when the projection Y fits into the notch of the barrel and the bent portion of the lever M assumes the character of a trigger-guard.

It will now be seen that by the above-described arrangement of levers three duties are performed—the operating of the barrel and the locking and releasing of the same. It will be evident that this lever arrangement is applicable to locking and releasing a barrel with a single bore, as is also the clip arrangement for retaining the spent cartridges as the barrel is moved outward from the breech.

I do not desire to claim broadly the employment of a lever with a projection for the double purpose of locking the barrel and moving it in and out, as such a device is shown in Greener's English Patent, No. 2,693 of 1854; but

I claim as my invention and desire to secure by Letters Patent—

1. The lever M, with its projection V and the rod N, in combination with the barrel and its stock, when the whole is arranged as set forth, and when the lever M is so formed as to serve the purpose of a trigger guard.

2. Causing the spent cartridges to be withdrawn from the barrel during the movement out of the same by means of a clip or clips applied and operating substantially as set forth.

In testimony whereof I have signed my name to this specification before two subscribing witnesses.

CHRISTIAN SHARPS.

Witnesses:
HENRY HOWSON,
JOHN WHITE.